3,277,035
MODIFIED ALKYD RESINS CONTAINING GLYCIDYL ESTERS OF MIXED ALPHA-BRANCHED SATURATED ALIPHATIC MONOCARBOXYLIC ACIDS
Geert C. Vegter and Feije H. Sinnema, Amsterdam, Netherlands, assignors to Shell Oil Company, New York, N.Y., a corporation of Delaware
No Drawing. Filed Sept. 18, 1962, Ser. No. 224,533
Claims priority, application Netherlands, Sept. 29, 1961, 269,732
7 Claims. (Cl. 260—22)

The invention relates to synthetic resins of the alkyd type and to the production of such resins. More particularly, this invention relates to a novel two-step process for preparing novel alkyd resins and to the resulting resins.

Specifically, the invention provides a process for preparing the alkyd resins which comprises mixing and reacting (1) a condensation product, (2) a polycarboxylic anhydride, and (3) epoxy alkyl esters of alpha-branched saturated aliphatic monocarboxylic acids, wherein said condensation product is the reaction product of (A) a polyvalent compound of the group consisting of polyvalent hydroxy compounds and epoxy compounds, (B) a polycarboxylic compound selected from the group consisting of polycarboxylic acids and polycarboxylic acid anhydrides, and (C) alpha-branched saturated aliphatic monocarboxylic acids.

Alkyd resins are well-known products which are used in paints, lacquers, casting resins, etc. They are prepared by reacting polycarboxylic acids or their anhydrides with polyhydroxy compounds or epoxy compounds. The base materials are so chosen that polyesters are formed of either branched or unbranched structure, while through the presence of reactive groups, such as double bonds or hydroxy groups, curing and crosslinking can be obtained.

Frequently, alkyd resins are modified with unsaturated monocarboxylic acids, as, for example, to improve flexibility. Fatty acids which contain ethylenic double bonds, such as linoleic and linolenic acid, are used to obtain air-drying resins. The preparation of alkyd resins from these materials is usually performed by first reacting the base materials, that is, first reacting the polyhydric alcohols with the polycarboxylic acids, with the unsaturated monocarboxylic acids being admixed afterwards.

It has previously been found that alkyd resins having very good properties are obtained by the process which comprises reacting together polycarboxylic acids and/or anhydrides, polyhydric alcohols and saturated aliphatic monocarboxylic acids in which the carboxyl group is attached to a tertiary or quaternary carbon atom. The resins thus modified are very suitable base materials for stoving enamels which have improved resistance to chemicals.

While this one-step process reduced the number of shortcomings possessed by many of the alkyd resins and improved such properties as hardness, recoatability, and chemical and physical resistance, there is still a need to improve these properties for some applications as, for example, their chemical resistance.

It is therefore an object of the present invention to provide a process for preparing new and useful alkyd resins having improved properties. It is another object to provide a process for preparing novel alkyd resins by a two-step process. It is another object to provide a process for preparing novel alkyd resins which are particularly suitable for the preparation of air-drying paints and lacquers which have high gloss and high impact resistance, and as stoving enamels. It is still another object to provide a process for preparing alkyd resins which are very resistant to chemical action and are especially suitable as casting resins and in laminates. It is a further object to provide new and useful alkyd resins. It is a further object to provide new modified alkyd resins having improved properties, such as high chemical resistance. It is still a further object to provide new and novel alkyd resins which are useful for stoving enamels. Other objects and advantages of the invention will become apparent to one skilled in the art from the accompanying disclosure and discussion.

It has now been found that these and other objects may be accomplished by the novel process which comprises mixing and reacting (1) a condensation product, (2) a polycarboxylic anhydride, and (3) epoxy alkyl esters of alpha-branched saturated aliphatic monocarboxlyic acids, wherein said condensation product is the reaction product of (A) a polyvalent compound of the group consisting of polyvalent hydroxy compounds and epoxy compounds, (B) a polycarboxylic compound selected from the group consisting of polycarboxylic acids and polycarboxylic acid anhydrides, and (C) alpha-branched saturated aliphatic monocarboxylic acids.

It has now been found that alkyd resins which are particularly suitable as stoving enamels and have high resistance to chemicals while retaining the other valuable and useful physical properties are prepared by the above-mentioned "two-step" process.

Thus, alkyd resins prepared by the process wherein the only monocarboxylic acid used are the branched saturated aliphatic monocarboxylic acids, are especially suitable for manufacturing stoving enamels that excel in hardness, impact resistance, gloss and resistance to chemicals.

For the sake of brevity, the saturated aliphatic monocarboxylic acids whose carboxyl group is attached to a tertiary or quaternary carbon atom will usually, in this specification, be referred to as branched or alpha-branched monocarboxylic acids.

The polycarboxylic acids which may be used in the preparation of the novel alkyd resins may be saturated, unsaturated, alicyclic, or aromatic and may possess two, three, four, or more carboxyl groups. Examples of such acids are malonic, glutaric, succinic, suberic, citric, aconitic, tricarballylic, cyclohexanedicarboxylic, maleic, fumaric, itaconic, citraconic, mesaconic, phthalic, isophthalic, terephthalic, tetrahydrophthalic anhydride, 1,8-naphthalenic, adipic, sebacic, azelaic, pimelic, chlorosuccinic, bromomaleic, dichlorophthalic, dilactic, dihydracrylic benzophenone-2,4'-dicarboxylic acid, trimellitic acid, dimerized fatty acids of drying oils, and Diels-Alder adducts of maleic acid with dienes such as terpenes, cyclopentadiene and hexachlorocyclopentadiene.

The preferred polycarboxylic acids to be used in producing the novel alkyd resins are the dicarboxylic acids containing less than 12 carbon atoms, such as succinic acid, glutaric acid, adipic acid, suberic acid, maleic acid, cyclohexanedicarboxylic acid, phthalic acid, diethyl phthalic acid and the like. Particularly preferred polycarboxylic acids are the aromatic dicarboxylic acids and anhydrides containing from 8 to 12 carbon atoms wherein the two carboxyl groups are attached directly to the aromatic ring.

In some cases it may be desirable to utilize other forms of the acid, such as the acid anhydrides or the acid chlorides, as phthalic anhydride, maleic anhydride, succinic chloride and the like.

If desired, two or more of these polycarboxylic acids can be used together. Whenever possible the use of the anhydrides of the polycarboxylic acids is preferred.

As saturated aliphatic monocarboxylic acids in which the carboxyl group is attached to a tertiary or quaternary carbon atom, those monocarboxylic acids may well be used which are obtained by reacting formic acid or carbon monoxide and water, with olefins, or with paraffins in the presence of hydrogen acceptors such as olefins or compounds, such as alcohols and alkyl halides, from which olefins can be obtained by splitting off water or hydrogen halide, respectively, under the influence of liquid acid catalysts such as sulfuric acid, phosphoric acid or complex compositions of phosphoric acid, boron trifluoride and water. These saturated aliphatic monocarboxylic acids branched at the alpha position and prepared in this manner are usually called Koch acids in the art ("Carbonsaure—Synthese aus Olefinen, Kohlenoxyd und Wasser," Koch, Brennstoff-Chemie, November 1955, pages 321–328). Monocarboxylic acids branched at the alpha position can also be obtained according to Reppe's method. Of special value are the acids from monoolefins with 8 to 18 carbon atoms. Mixtures of olefins obtained by cracking paraffinic hydrocarbons, such as petroleum fractions, are preferably used as starting material. These mixtures may contain both branched and unbranched acyclic olefins as well as cycloaliphatic olefins. By the action of formic acid or of carbon monoxide and water, a mixture of saturated acyclic and cycloaliphatic monocarboxylic acids is obtained therefrom.

The polycarboxylic acids and/or alpha-branched saturated aliphatic monocarboxylic acids may be replaced in part by unsaturated monocarboxylic acids in order to increase flexibility. These unsaturated monocarboxylic acids include, among others, the fatty acids from drying oils, such as linseed oil, Chinese wood oil, soybean oil, fish oil, cottonseed oil, oiticica oil, perilla oil, sunflower oil, as well as dehydrated fatty acids from castor oil, and fatty acids from tall oil. Other unsaturated monocarboxylic acids that may be applied are, for example, arcylic acid and methacrylic acid. Particularly suitable are the aliphatic fatty acids having from 12 to 20 carbon atoms in the molecule.

As polyvalent hydroxy and/or epoxy compounds, preferably used are those containing three or more hydroxy equivalents per molecule, one epoxy group being taken to be equivalent to two hydroxy groups. If desired, two or more of these compounds may be used together. Thus, trivalent hydroxy and/or epoxy compounds may be used together with bivalent hydroxy compounds and/or monoepoxy compounds. As examples may be mentioned the hydroxy compounds glycerol, pentaerythritol with dipropylene glycol and glycidol with dipropylene glycol. Particularly preferred are the aliphatic and cycloaliphatic polyvalent hydroxy and/or epoxy compounds having from 3 to 12 carbon atoms per molecule.

A functionality of at least 3, so far as the ester-forming functions are concerned, in at least some of the starting materials is important for achieving branching and a three-dimensional structure. This also applies to the polyvalent hydroxy and/or epoxy compounds and/or to the polycarboxylic acids and/or anhydrides thereof, from which, if desired, first esters may be prepared which still contain free hydroxyl and/or epoxy groups and which are then reacted with monocarboxylic acids. Ester-forming functions comprise hydroxyl groups, epoxy groups and carboxyl groups.

In preparing the above-mentioned condensation products the base materials may be added in one pass or gradually, or in stages and in various orders to the mixture to be reacted.

The proportions of the various ingredients used to prepare the condensation product of the first step can vary over a wide range. The preferable optimum proportion of the polyhydric alcohol or epoxy compound to the total acid will, for example, depend on many factors including the particular alcohol used, the particular dibasic acid or anhydride used, the particular branched monocarboxylic acids used and the properties desired. However, in general, the equivalents of total acid (polybasic acid and monocarboxylic acids) to alcohol will be in the range of from about 1.2:1 to about 1:4. Of the total acids, the ratio of polycarboxylic acid to branched monocarboxylic acid will vary within wide limits. However, the ratio of polycarboxylic acid to branched monocarboxylic acids on an equivalent basis will range from about 0.8:1 to about 3:1. If unsaturated monocarboxylic acids are also used to obtain air-drying alkyd resins, such acids are to be included in the calculation of total acids as well as the polycarboxylic acids and/or anhydrides and alpha-branched saturated aliphatic monocarboxylic acids. In general up to 50% of the alpha-branched saturated aliphatic monocarboxylic acids may be replaced with unsaturated monocarboxylic acids.

The condensation products are generally prepared at temperatures between 130 and 270° C.; during a stage in which water is formed a temperature between 190 and 250° C. is preferably maintained. Thus, one may react phthalic anhydride, glycidol and branched monocarboxylic acids first at 150° C., at which temperature mainly epoxy groups and anhydride groups react, and then raise the temperature to 190–230° C., which causes the reaction to continue, with formation of water.

An organic solvent, for instance xylene, may be added to the reaction mixture. The water formed during condensation can easily be removed together with xylene by aseotropic distillation.

The epoxy alkyl esters of the alpha-branched saturated aliphatic monocarboxylic acids may be prepared by any of the known methods, such as, for example, by simply reacting under known conditions a halo-substituted monoepoxide or a dihalohydrin with an alpha-branched saturated aliphatic monocarboxylic acid, or their salts. Suitably halo-substituted epoxide reactants include the bromo- and fluoro-substituted compounds although the chloroepoxy compounds are preferred. The halo substituted epoxide reactant may suitably contain from about 3 to about 20 carbon atoms in the molecule. Preferred reactants include, among others, epibromohydrin, epifluorohydrin, 1-chloro-2,3-epoxybutane, 1-chloro-2,3-epoxyhexane, 1-chloro-2,3-epoxy-4-phenyl octane, 1-chloro-2,3-epoxy-4,5-diethyl dodecane, 3-chloro-4,5-epoxy octane.

Suitable dihalohydrins comprise the hydroxy-dihalo-substituted alkanes containing from about 3 to about 20 carbon atoms and are preferably hydroxy-dichloro-substituted alkanes having a chlorine atom and a hydroxyl group attached to adjacent carbon atoms. Suitable hydroxy-dichloro-substituted alkanes include, among others, 1,3-dichlorohydrin, 1,2-dichlorohydrin, their homologues and analogues.

Catalysts, such as tertiary amines and quaternary ammonium salts, may be employed, if desired.

Solvents or diluents may also be utilized as desired and include normally liquid hydrocarbons, dioxane, ketones, etc., and mixtures of two or more thereof.

A suitable temperature range is from about 50° to about 150° C.

Alkali metal salts and quaternary ammonium salts may be very suitably used as the salts of the alpha-branched saturated aliphatic monocarboxylic acids.

The preparation of suitable epoxy alkyl esters of alpha-branched saturated aliphatic monocarboxylic acids is disclosed in greater detail in copending United States application, Serial Number 28,865, filed May 13, 1960, now U.S. 3,178,454, issued April 13, 1965.

In the second stage of the process according to the invention the above-mentioned condensation products are caused to react with polycarboxylic anhydrides and with epoxy alkyl esters of the said branched monocarboxylic acids. The polycarboxylic anhydrides are preferably dicarboxylic anhydrides, such as phthalic anhydride, maleic anhydride or Diels-Alder adducts of maleic anhydride with dienes. Polycarboxylic anhydrides and epoxy alkyl esters are preferably applied in virtually equivalent quantities, an epoxy group being taken equivalent to a dicarboxylic anhydride group. However, the ratio of polycarboxylic anhydrides plus epoxy alkyl esters on the one hand and condensation product on the other, may be varied within wide limits. When the polycarboxylic anhydride is phthalic anhydride and the epoxy alkyl esters are glycidyl esters of branched monocarboxylic acids with 9–11 carbon atoms per molecule, ratios by weight of less than 2:1 are preferred, such as less than 1:2, for instance 1:4. The economic advantage gained by the use of a maximum amount of free monocarboxylic acids is important in this connection.

During the second stage of the process a lower temperature can generally be maintained than during the preparation of the condensation products in the first stage. Temperature between 130 and 170° C., for example 150° C., is recommended. As a rule, the temperature rises owing to the heat of reaction generated, but by cooling it can be kept below a given limit, for instance below 200° C. To prevent any excessive rise in temperature a mixture of epoxy alkyl esters and polycarboxylic anhydrides may also be added gradually to a condensation product maintained at a constant reaction temperature. A steady and fairly low reaction temperature also has a favorable effect upon the color of the resin.

The resins prepared according to the invention are, in general, very readily miscible with the usual solvents and mixtures of solvents, such as aromatic hydrocarbons and mixtures thereof with highly aromatic hydrocarbon mixtures or alcohols. They may be processed by the usual methods to paints, lacquers and varnishes, together with conventional additives, such as pigments, other resins, solvents, thickening agents, etc. The resins have a light color and are therefore very suitable for making white and light-colored paints and lacquers.

Alkyd resins containing only a few double bonds or none at all are applied in stoving enamels. They are generally mixed with phenol formaldehyde resins, urea formaldehyde resins or melamine formaldehyde resins. During stoving, the free hydroxyl and/or carboxyl groups still present in the alkyd resin play an important part.

To illustrate the manner in which the invention will be carried out, the following examples are given. It is to be understood, however, that the examples are for the purpose of illustration and the invention is not to be regarded as limited to any of the specific conditions or reactants cited therein. Unless otherwise specified, parts described in the examples are by weight.

Some of the test methods for evaluating the novel modified alkyd resins of the present invention are described as follows:

Viscosity was determined in a 50% solution in xylene. The color was measured by comparing the color of a 50% solution of the resin in xylene Gardner scale.

Paint coats were evaluated on the basis of hardness, flexibility, impact resistance and resistance to chemicals. Hardness was determined by Buchholz's method. Impact resistance was determined by the British Standard Method which is the product of the height (in cm.) from which a weight (in kg.) must drop on to a painted metal panel to cause the coat on the bottom of the panel to crack. Flexibility was determined by bending a painted metal panel successively round mandrels having diameters of ¼, ⅛, and 1/16 inch and observing whether the lacquer coat exhibited any cracks. Penetration according to Erichsen was determined by slowly pressing a metal ball into a lacquer-coated metal panel supported by a ring around the point of contact, and recording how many millimeters the ball could be pressed into the panel before the lacquer coat cracked.

Resistance to chemicals was evaluated by exposing the lacquer-coat at 25° C. for 7 days to the action of a 5% solution of sodium hydroxide and of a 5% solution of acetic acid. The rating 0 means a completely destroyed coat; the rating 10, no attack.

The branched monocarboxylic acids ($C_9$–$C_{11}$) have been obtained by reacting olefins containing from 8 to 10 carbon atoms per molecule with carbon monoxide and water in the presence of a catalyst consisting of phosphoric acid, boron trifluoride and water. They contain 9 to 11 carbon atoms per molecule and the carboxyl groups are attached to tertiary and/or quaternary carbon atoms. The sodium salts thereof have been converted into the glycidyl esters with the aid of epichlorohydrin.

*Example I*

A mixture of 108.6 parts of phthalic anhydride, 56.5 parts of branched monocarboxylic acids ($C_9$–$C_{11}$), 81 parts of glycerol, and 24 parts of xylene was kept with stirring at 240° C. for 2½ hours in a nitrogen atmosphere. The water formed was continuously removed by azeotropic distillation. After the mixture had been cooled to 150° C., 311 parts of glycidyl esters of branched monocarboxylic acids ($C_9$–$C_{11}$) and 189.8 parts of phthalic anhydride were added.

The mixture was then kept at 150° C. for another 1½ hours. The resin thus obtained had an acid value of 6.8, a color (Gardner) of <1, a viscosity of 54.6 cs., contained 129 meq. of hydroxyl per 100 parts of dry material, and was miscible with xylene.

A stoving enamel prepared from 70 parts of this resin, 30 parts of urea formaldehyde resin and 90 parts of titanium white was applied to thin steel panels and then stoved at 150° C. for 40 minutes.

Testing yielded the following results: hardness (Buchholz) 89, flexible round a mandrel of 1/16 inch, impact resistance 16 kg. cm., penetration (Erichsen) 6.3 mm., resistance to NaOH 9, resistance to acetic acid (vapor) 8.

*Example II*

A mixture of 65.4 parts of phthalic anhydride, 41.6 parts of branched monocarboxylic acids ($C_9$–$C_{11}$), 48.8 parts of glycerol, and 16 parts of xylene was kept with stirring for 3 hours at 240° C. in a nitrogen atmosphere. The water formed was continuously removed by azeotropic distillation. When the mixture had been cooled to 150° C., 136 parts of glycidyl esters of branched monocarboxylic acids ($C_9$–$C_{11}$) and 82.6 parts of phthalic anhydride were added.

The mixture was then kept at 150° C. for another 1¾ hours. The resulting resin had an acid value of 7.2, a color (Gardner) of <1, a viscosity of 72.9 cs., contained 142 meq. of hydroxyl per 100 parts of dry material, and was miscible with xylene.

A stoving enamel was prepared from 70 parts of this resin, 30 parts of urea formaldehyde resin, and 90 parts of titanium white was applied to thin steel panels and then stoved at 150° C. for 40 minutes.

Testing yielded the following results: hardness (Buchholz) 93, flexible round a mandrel of 1/16 inch, impact resistance 14 kg. cm., penetration (Erichsen) 5.8 mm., resistance to NaOH 8, resistance to acetic acid (vapor) 8.

*Example III*

A mixture of 85.1 parts of phthalic anhydride, 63.4 parts of branched monocarboxylic acids ($C_9$–$C_{11}$), 63.5 parts of glycerol, and 21 parts of xylene was kept with stirring for 5½ hours at 240° C. in a nitrogen atmosphere. The water formed was continuously removed by azeotropic distillation. When the mixture had been cooled to 150° C., 104.5 parts of glycidyl esters of branched monocarboxylic acids ($C_9$–$C_{11}$) and 62.9 parts of phthalic anhydride were added.

The mixture was then kept at 150° C. for another 1½ hours. The resin had an acid value of 8.6, a color (Gardner) of <1, a viscosity of 105 cs., contained 150 meq. of hydroxyl per 100 parts of dry material, and was miscible with xylene.

A stoving enamel prepared from 70 parts of this resin, 30 parts of urea formaldehyde resin and 90 parts of titanium white was applied to thin steel panels and then stoved at 150° C. for 40 minutes.

Testing yielded the following results: hardness (Buchholz) 89, flexible round a mandrel of 1/16 inch, impact resistance 10 kg. cm., penetration (Erichsen) 5.8 mm., resistance to NaOH 9, resistance to acetic acid (vapor) 8.

*Example IV*

A mixture of 99.9 parts of phthalic anhydride, 80.6 parts of branched monocarboxylic acids ($C_9$–$C_{11}$), 74.6 parts of glycerol, and 26 parts of xylene was kept with stirring for 4 hours at 240° C. in a nitrogen atmosphere. The water formed was removed continuously. After cooling to 150° C., 81 parts of glycidyl esters of branched monocarboxylic acids ($C_9$–$C_{11}$) and 49 parts of phthalic anhydride were added.

The mixture was then kept at 150° C. for another 2 hours. The resin had an acid value of 6.5, a color (Gardner) of <1, a viscosity of 138 cs., contained 191 meq. of hydroxyl per 100 parts of dry material, and was miscible with xylene.

A stoving enamel prepared from 70 parts of this resin, 30 parts of urea formaldehyde resin and 90 parts of the titanium white was applied to thin steel panels and then stoved at 150° C. for 40 minutes.

Testing yielded the following results: hardness (Buchholz) 90, flexible round a mandrel of 1/16 inch, impact resistance 15 kg. cm., penetration (Erichsen) 6.2 mm., resistance to NaOH 7, resistance to acetic acid (vapor) 7.

*Example V*

A mixture of 118.4 parts of phthalic anhydride, 103 parts of branched monocarboxylic acids, 88.3 parts of glycerol, and 31 parts of xylene was kept with stirring at 240° C. for 4½ hours in a nitrogen atmosphere. The water formed was removed continuously. After cooling to 150° C. 48.6 parts of glycidyl esters of branched monocarboxylic acids ($C_9$–$C_{11}$) and 29.6 parts of phthalic anhydride were added.

The mixture was then kept at 150° C. for another 2 hours. The resin had an acid value of 8.3, a color (Gardner) of <1, a viscosity of 246 cs., contained 195 meq. of hydroxyl per 100 parts of dry material, and was miscible with xylene.

A stoving enamel prepared from 70 parts of this resin, 30 parts of urea formaldehyde resin and 90 parts of titanium white was applied to thin steel panels and then stoved at 150° C. The enamel coat had great hardness, flexibility and impact resistance; it was virtually not affected by caustic soda and acetic acid vapor.

*Example VI*

The procedure of Example I is substantially repeated except that the glycerol is replaced with an equivalent amount of each of the following: glycidol, a 50–50 mixture of glycerol and diethylene glycol, pentaerythritol and 1,2,6-hexanetriol. Related results are obtained in each case.

*Example VII*

The procedure of Example II is substantially repeated wherein phthalic anhydride is replaced in both the first and second steps with one of the following: tetrahydrophthalic anhydride, succinic anhydride and mixtures of phthalic anhydride with succinic and tetrahydrophthalic anhydrides. Related results are obtained in each instance.

*Example VIII*

The procedure of Example I is essentially repeated except that about 10% (6 parts) of the branched monocarboxylic acids are replaced with linoleic acid. An alkyd resin having improved flexibility as well as improved chemical resistance is obtained.

We claim as our invention:

1. A two-step process for preparing alkyd resins which comprises a first step of mixing and reacting (1) a polycarboxylic compound selected from the group consisting of polycarboxylic acids and polycarboxylic acid anhydrides, (2) a polyhydric alcohol containing from 3 to 12 carbon atoms in the molecule, and (3) mixed alpha-branched saturated aliphatic monocarboxylic acids containing from 9 to 19 carbon atoms in the molecule, and prepared by reacting monoolefins with carbon monoxide and water in the presence of liquid acid catalysts, the equivalents of total acid in (1) and (3) to the polyhydric alcohol of (2) being in the range of about 1.2:1 to 1:4, then in a second step, reacting the first step reaction product with (4) a polycarboxylic acid anhydride, and (5) glycidyl esters of mixed alpha-branched saturated aliphatic monocarboxylic acids prepared by reacting epichlorohydrin with the said alpha-branched saturated monocarboxylic acids containing from 9–19 carbon atoms in the molecule and prepared as in (3), the amounts of (4) and (5) being in approximate equivalent quantities and the total weight ratio of (4) and (5) to (1), (2) and (3) being less than 2:1.

2. A process as in claim 1 wherein the polyhydric alcohol is glycerol.

3. A process as in claim 1 wherein the polycarboxylic compound is phthalic anhydride.

4. A process as in claim 1 wherein the alpha-branched saturated aliphatic monocarboxylic acids contain from 9 to 11 carbon atoms.

5. A process for preparing alkyd resins which comprises mixing and reacting (1) a condensation product of (A) glycerol, (B) phthalic anhydride, and (C) mixed alpha-branched saturated aliphatic monocarboxylic acids containing from 9 to 11 carbon atoms in the molecule and prepared by reacting monoolefins with carbon monoxide and water in the presence of liquid acid catalysts, the equivalents of total acid in (B) and (C) to the glycerol of (A) being in the range of 1.2:1 to 1:4, with (2) phthalic anhydride, and (3) glycidyl esters of alpha-branched saturated aliphatic monocarboxylic acids having from 9 to 11 carbon atoms in said acid and prepared by reacting said acids with epichlorohydrin, the amounts of (2) and (3) being in approximate equivalent quantities and the total weight ratio of (2) and (3) to (1) being less than 2:1.

6. An alkyd resin useful in making stoving enamels and exhibiting excellent resistance to chemicals, comprising the reaction product obtained by mixing and reacting (1) a condensation product of (A) glycerol, (B) phthalic anhydride, and (C) mixed alpha-branched saturated aliphatic monocarboxylic acids containing from 9 to 11 carbon atoms in the molecule and prepared by reacting monoolefins with carbon monoxide and water in the presence of liquid acid catalysts, the equivalents of total acid in (B) and (C) to the glycerol of (A) being in the range of 1.2:1 to 1:4, with (2) phthalic anhydride, and (3) glycidyl esters of alpha-branched saturated aliphatic monocarboxylic acids having from 9 to 11 carbon atoms in said acid and prepared by reacting said acids with epichlorohydrin, the amounts of (2) and (3) being in approximate equivalent quantities and the total weight ratio of (2) and (3) to (1) being less than 2:1.

7. An alkyd resin as in claim 6 wherein up to 50% of the alpha-branched saturated aliphatic monocarboxylic acids are replaced with unsaturated aliphatic monocarboxylic acids having from 12 to 20 carbon atoms in the molecule.

References Cited by the Examiner

FOREIGN PATENTS 110,783  4/1961  Pakistan.

MURRAY TILLMAN, *Primary Examiner.*

E. J. TROJNAR, P. LIEBERMAN,

*Assistant Examiners.*